INVENTORS
WOLFGANG REYMANN
VEIT DÖLKER
GERHARD LINIER

INVENTORS
WOLFGANG REYMANN
VEIT DÖLKER
GERHARD LINIER

INVENTORS
WOLFGANG REYMANN
VEIT DÖLKER
GERHARD LINIER

INVENTORS
WOLFGANG REYMANN
VEIT DÖLKER
GERHARD LINIER

Feb. 17, 1970 W. REYMANN ET AL 3,495,723

DRAGLINE FOR BULK STORAGE

Filed Aug. 20, 1968 10 Sheets-Sheet 5

INVENTORS
WOLFGANG REYMANN
VEIT DÖLKER
GERHARD LINIER

INVENTORS
WOLFGANG REYMANN
VEIT DÖLKER
GERHARD LINIER

INVENTORS
WOLFGANG REYMANN
VEIT DÖLKER
GERHARD LINIER

INVENTORS
WOLFGANG REYMANN
VEIT DÖLKER
GERHARD LINIER

INVENTORS
WOLFGANG REYMANN
VEIT DÖLKER
GERHARD LINIER

INVENTORS
WOLFGANG REYMANN
VEIT DÖLKER
GERHARD LINIER

United States Patent Office 3,495,723
Patented Feb. 17, 1970

3,495,723
DRAGLINE FOR BULK STORAGE

Wolfgang Reymann, Hockenheim, Veit Dölker, Wiesloch, and Gerhard Linier, Mannheim, Germany, assignors to Rolandia G.m.b.H., Glarus, Switzerland Filed Aug. 20, 1968, Ser. No. 754,027
Claims priority, application Germany, Aug. 21, 1967, 1,531,794
Int. Cl. B65g 65/28, 3/04
U.S. Cl. 214—10 14 Claims

ABSTRACT OF THE DISCLOSURE

A dragline serving a plurality of bulk material compartments is provided with limit switches for substantially complete automatic operation.

This invention relates to a device for the heaping up, by scraping against a storage or receiving means, of bulk materials, especially aggregates to be used for the production of concrete, bituminous or asphaltic material, against a feeding device, for example, for supplying a mixer, consisting of a boom provided with a scraper bucket which is mechanically hauled in and pulled back to cover by scraping the aggregrates stored at ground level in various radially arranged compartments. The object of this invention is to substantially increase the output of such a device without necessitating large additional expenditure.

The devices hitherto used for the heaping up, by scraping against a storage shield, of bulk materials, especially for the heaping up of aggregates for the production of concrete against a centrally arranged feeding means cooperating with a mixer and carrying at its top a boom scraper with a scraper bucket, which is hauled in against the storage shield by means of one rope and pulled back by means of another rope, have been already automated to a degree which makes an operator's cabin unnecessary. With these devices the scraper bucket is hauled in and pulled out automatically with the bottom in a given position. One operator, who at the same time controls the mixer, has to move the boom with the scraper bucket to the desired compartment and to control the lateral movement of the boom within the compartments. As a result the operator is kept rather busy. Such partially automated devices can therefore only be provided for reduced outputs. The object of this invention is to control the movement of the boom with the scraper bucket so that complete automation of all operations is obtained. This includes complete coverage of each compartment over its entire range, and automatic raising of the scraper bucket above the partition walls for its transfer from one compartment to another where the scraper bucket is required. In addition, a predetermined sequence of operations in accordance with the respective requirements for live, that is, self-feeding, aggregate storage supply is obtained.

These objects are achieved by this invention in that the lateral movement of the boom after each hauling and return operation of the scraper bucket is controlled by a time relay, while limit switches are provided for the limitation and reversal of the boom sluing movement with the entire range of a compartment and for either side of the partition walls separating the various compartments. This makes it also possible to automate in a simple way the lateral movement of the boom so that it no longer calls for the attention of the operator, and the material contained in the entire range of a compartment is pulled up uniformly without the formation of scraping trenches or holes in the ground. At the same time, it is ensured that the scraper bucket does not get close to the partition wall or hits it. Another switch (limit switch or time relay) is provided for stopping the scraper operation at the end of the pull-back movement when the scraper bucket is in a position clear of the partition walls. This permits determining the end of a pre-established pull-back movement in such a way that the scraper bucket is in a position above the partition walls when it is stopped. This position is required for sluing the boom with the scraper bucket from one compartment to another.

In order to mark the position of the scraper bucket within a compartment, a limit switch operating the relay with a control lamp has been centrally provided. As an additional feature of the automatic control of the sluing operation of the boom from one compartment to another with the scraper bucket raised above the partition walls, a switch governing this position has been centrally provided which permits this sluing operation. This makes it possible to move the scraper bucket after completion of a pre-determined pull-back operation to another compartment. Hitherto this had to be done manually by operating a toggle switch at the given moment. After that the boom had to be moved to the desired compartment by operating a switch by hand until the boom had reached the desired position. Now, however, the operator can predetermine, with the aid of this single switch, that the scraper bucket, upon completion of the next pull back operation, is moved from the compartment in which it has been working to another predetermined compartment and to resume automatically its scraping operation there. All centrally arranged switches can be united in one controller drum with adjustable cams. Such a controller drum including all switches can be centrally located in a minimum of space.

The drive for the sluing operation of the boom and the hauling-in and pull-back operation of the scraper bucket must be easy to control and respond exactly to the control operations. For this reason, it is proposed by this invention preferably to provide independent geared motors for the hauling operation and for the pull-back operation of the scraper bucket as well as the sluing operation of the boom. It is known to provide one geared motor with built-in brake for the sluing operation of the boom and another geared motor with two clutches and two brakes for the hauling-in and pull-back operation of the scraper bucket. The provision of an independent geared motor with a built-in brake for each of these operations offers the advantage of a simpler mechanical construction and more exact electrical control. It is convenient to provide each of the geared motors with a built-in brake for the hauling-in operation and the pull-back operation with an independent rope drum mounted on the motor shaft. This permits the elimination of an additional bearing for the two rope drums which require two clutches, if only one geared motor is used. The use of two geared motors with built-in brake permits provision of the rope drums in overhung position. In addition, the diameter of the rope drums can be larger because their size is not determined by any clutch. Large-diameter rope drums will reduce the wear and tear of the hauling-in and pull-back ropes.

The independently geared motors with built-in brake for the various operations can be arranged on a sluing or laterally shifting common frame, which also carries the boom. However, these geared motors with built-in brake can also be arranged in a different way, for example, all of them on a feeding device or the motor for the pull-back rope alone on the boom. Such a separate arrangement can be of advantage with smaller machines and with mobile machines. With this arrangement, the geared motors with built-in-brake for the hauling operation and the pull-back operation can be positioned on a common frame in parallel fashion with some space between them which is utilized for mounting the geared motor with built-in brake for sluing the common frame with the boom. This affords an advantageous arrangement within a minimum of space.

It is known to provide a central control panel for an aggregate feeding device for a mixer, which is located on the operator's stand of the latter. According to this invention, this control panel features for each compartment a corresponding sector with a control lamp indicating the position of the boom at any given moment, so that the mixer operator knows at all times in which compartment the scraper bucket is operating. Furthermore, this control panel is advantageously provided with a switch for selecting any compartment.

For safety reasons, warning lamps can be provided, one on top of the switch-box and another at the tip of the boom, both of which start blinking as soon as the control current is switched on. Fully automatic devices require warning lamps because of sudden automatic resumption of operation after a brief period of standstill.

If a device according to this invention has compartments arranged in sectors without a central point and/or an eccentrically positioned turning axle of the sluing frame of the boom, it is possible to provide for this boom a second sluing mechanism with a swivel arm at the extreme end of which is arranged the sluing frame of the boom with the additional sluing mechanism serving for selecting the compartment. With such additional sluing mechanism even irregularly arranged compartments can be perfectly covered by the scraper bucket.

The means by which the objects of this invention are obtained are described more fully with reference to the accompanying drawings, in which.

Figure 1:
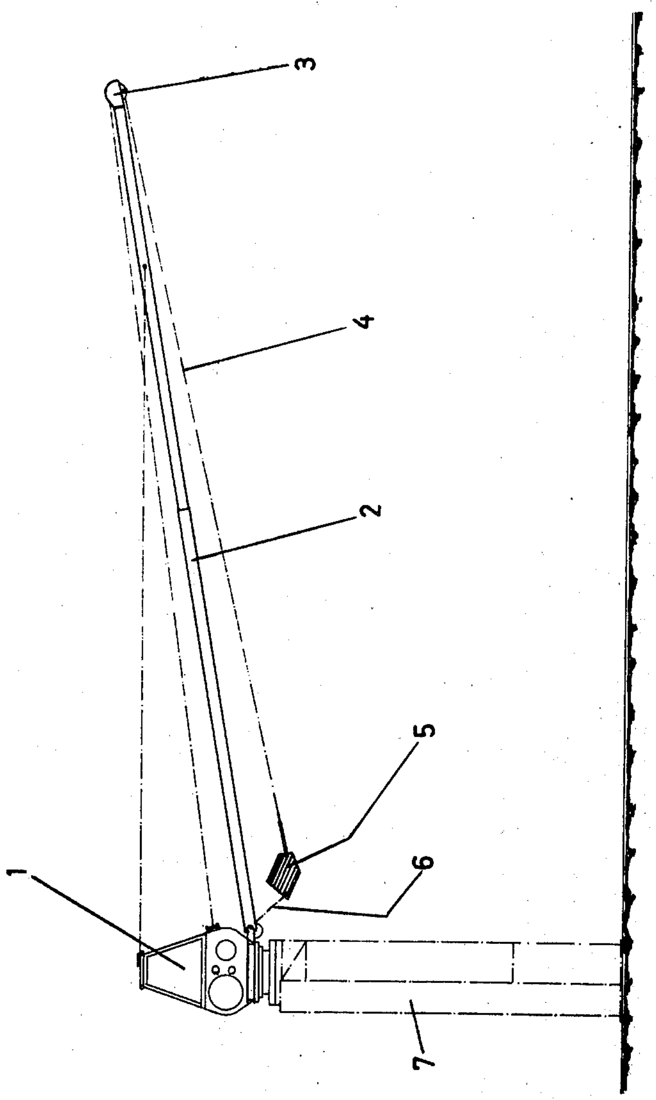
FIGURES 1, 2, 3 and 4 are side elevational views of the apparatus in different operating positions.
Figure 2:
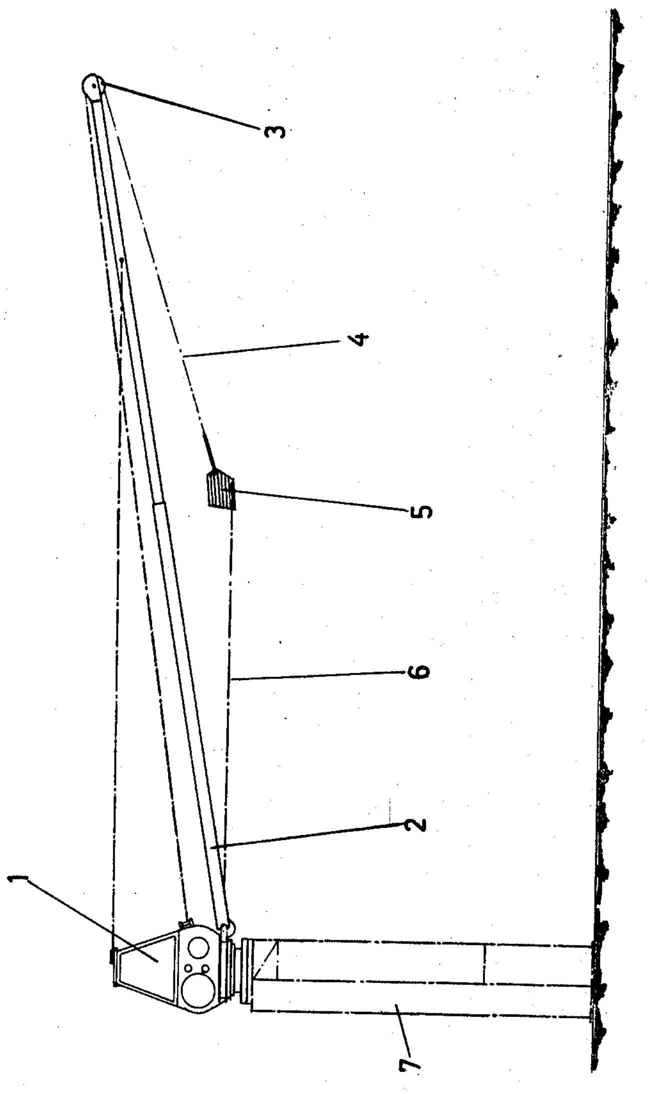

As shown in FIGURES 1 to 4, sluing frame 1 carries boom 2, at the far end of which is mounted a pulley 3. This pulley 3 guides the pull-back rope 4, which is likewise fastened to the rear side of the scraper bucket 5. One end of the hauling rope 6 is fastened to the front side of the scraper bucket 5, while its other end is likewise fastened to the sluing frame 1.

FIGURE 1 shows the scraper bucket 5 stopping in its highest position at the end of a scraping operation, with the hauling rope 6 completely reeled in and the pull-back rope 4 completely reeled off. By means of the adjustable time relay provided on the control panel, a delay of any desired length can be inserted with the scraper bucket 5 in this position. This permits controlling the scraping capacity to adapt it to the output capacity of the concrete mixing plant. As soon as a new operating cycle is to be initiated automatically, either immediately or after a predetermined delay of the scraper bucket 5 in the position according to FIGURE 1, the pull-back rope 4 starts pulling without the hauling rope 6 being allowed to reel off its drum at the same time. As a result, the scraper bucket 5, which is still on top of the material heap, is lifted and emptied. After that the scraper bucket is moved by the pull-back rope with the hauling rope 6 cooperating towards the free end of the boom until it reaches the position according to FIGURE 3. In this position, the hauling rope 6 is completely reeled off while the pull-back rope 4 is reeled in. The scraper bucket is high above the ground so that it is either beyond a freshly supplied material heap or can be made to settle on this heap. This, too, is shown in FIGURE 3.

With the devices hitherto known, the scraper bucket 5 is pulled back close to the free end of the boom. When being lowered from this position with the hauling rope 6 stopped and pull-back rope 4 being reeled off, the scraper bucket 5 describes a circular arch around the winch of the hauling rope, or a guide roller positioned in front of this winch, and is thereby made to reach the ground or the material heap in a position indicated in FIGURE 3 by a chain-dotted line. In this position, the scraper bucket 5 has a considerably shorter scraping distance than with the arrangement according to the present invention as shown in FIGURE 3.

Figure 3:
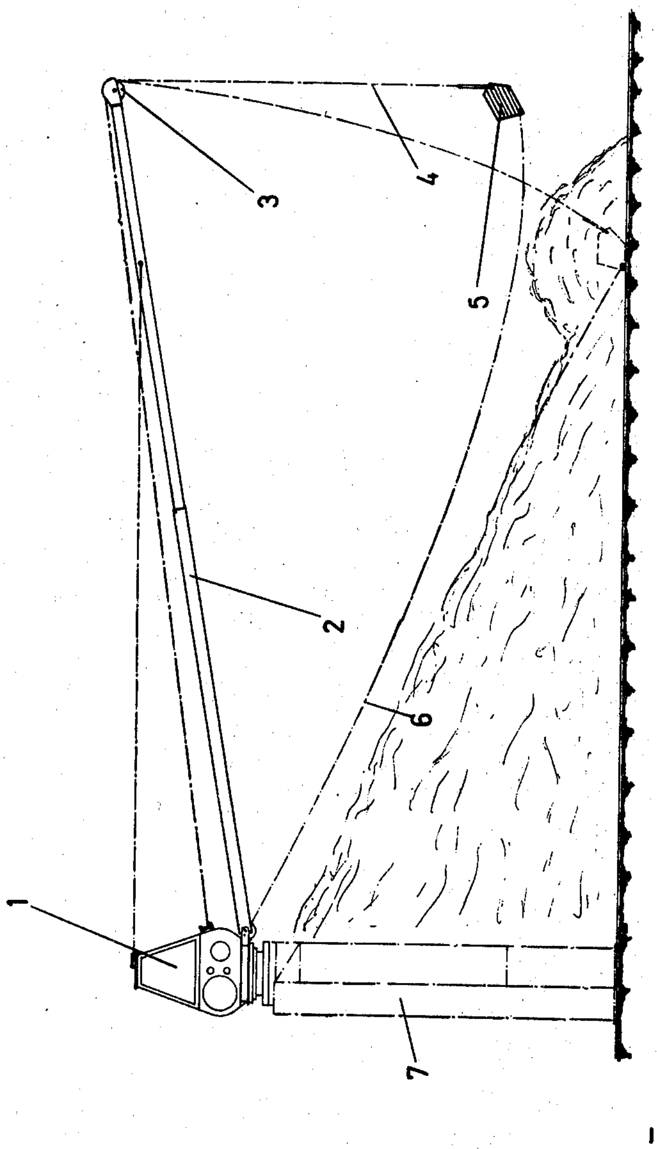
Figure 4:
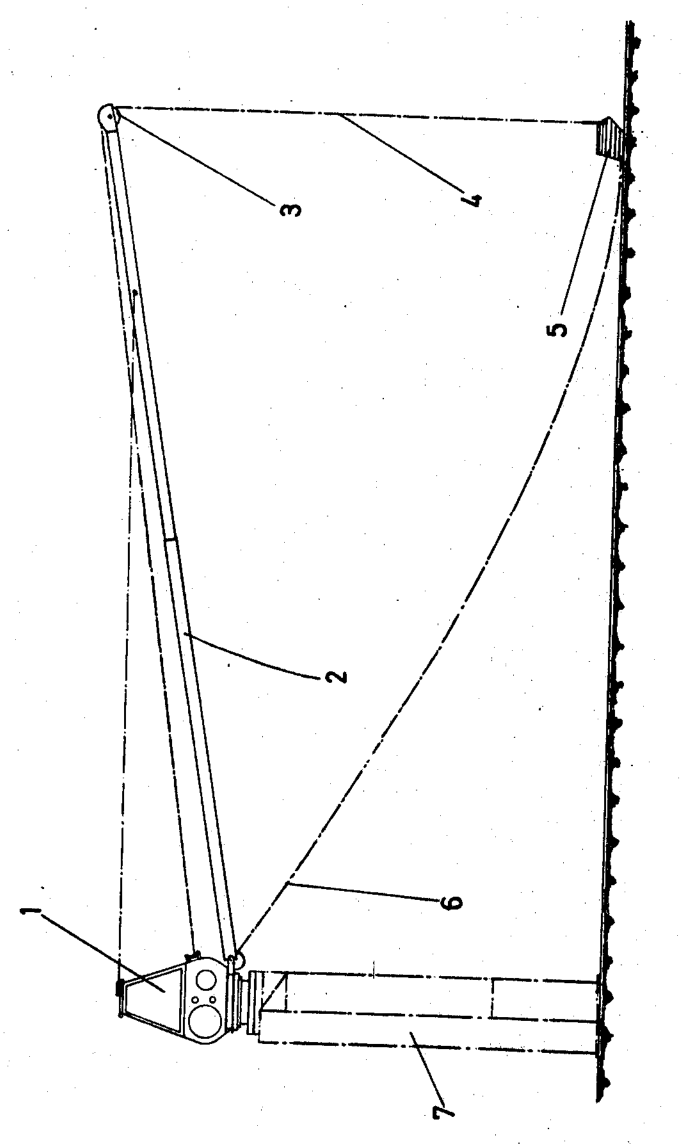

In this invention, when the scraper bucket 5 is lowered from the position according to FIGURE 3, in which the hauling rope is completely reeled off while the pull-back rope is completely reeled in, the bucket 5 reaches the position according to FIGURE 4, and a time relay ensures that the scraper bucket is lowered, controlled by electric motor, down to a point slightly above the ground. Only then is the motor brake released, so that the scraper bucket settles smoothly on the ground.

After settling beyond the freshly supplied material or on it, the scraper bucket 5 occupies the position shown in FIGURE 4. This position is the point of departure for a new scraping or hauling operation. By reeling in the hauling rope 6 the scraper bucket 5 is hauled towards the storage shield or feeding device 7 on top of which is mounted the sluing frame 1. At the same time, the pull-back rope 4 is allowed to be reeled off with the brake of its geared motor released until it is completely reeled off and the brake of its geared motor is applied again by the corresponding limit switch. The hauling rope can be further reeled in in accordance with the shape of the material heap until its limit switch stops its geared motor with built-in brake when the scraper bucket 5 has reached its end position as shown in FIGURE 1.

If it is desired to reduce the scraping or hauling operation of the scraper bucket 5, as may be the case when large material supplies have been dumped at the foot of a storage heap without being immediately required to replenish the live supply at the top, an adjustable time relay for limiting the scraping operation can be switched on. The likewise provided overload relay serves to interrupt the hauling operation of the scraper bucket 5 in case of overload and to initiate the pull-back operation.

Figure 5:
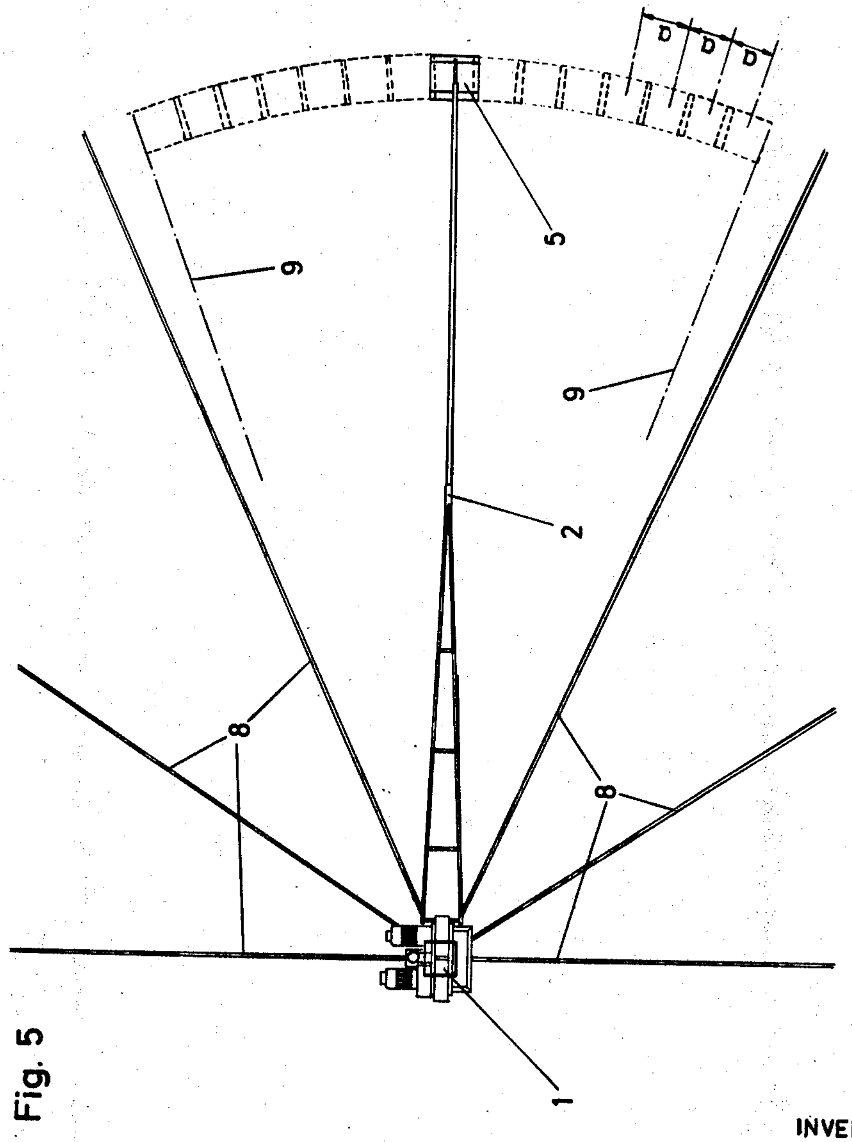
FIGURE 5 is a plan view of FIGURES 1 to 4.

For further explanation of these operations, FIGURE 5 shows how boom 2 with the scraper bucket 5 covers several radially arranged aggregate compartments of a device for the production of concrete with the sluing frame 1 mounted on top of the centrally arranged feeding means 7 which is not seen in this plan view. The compartments are separated by the partition walls 8. As shown in FIGURE 5, the boom 2 is in the middle of the central compartment. The scraper bucket 5 is in the position according to FIGURE 3 or 4. If the central compartment is to be covered, the limit switches for this compartment are so set that the maximum scraping area is limited by the dash-dot lines 9. In this way the scraper bucket 5 is prevented from getting too close to the partition walls 8. The maximum scraping area within the other compartments is limited in the same way. The position of the boom 2 within the maximum scraping area between the dash-dot lines 9 of any compartment is likewise indicated by a limit switch, preferably located on the control panel. The lateral advance of the boom 2 after each scraping operation is controlled by a time relay. The boom 2 advances each time by a step A in one or the other direction until it reaches the limit switch corresponding to the dash-pointed line 9. After that, the lateral advance is inverted.

If it is intended to end the scraping operation in one compartment and resume it in another this can be achieved in various ways. Thus, for example, if the compartment being covered signals an abundant live material supply or if another compartment signals an insufficient live material supply, it is possible, by operating a corresponding switch, to stop the scraper bucket 5 in a position in which the boom 2 can be transferred together with the scraper bucket 5 to another compartment. This is the position according to FIGURE 2. The transfer of the scraper bucket 5 to another compartment can also be accomplished in the same way through the intermediary of a selection switch. By providing automatic cycle operation the movement of the boom 2 from one compartment to another can be achieved fully automatically by a control switch. The movement of the boom 2 can also be initiated through a relay by a switch operated as an empty signal by the level of the live material supply. For this purpose, a corresponding switch has to be provided in each compartment which, upon replenishment of the live material supply, stops the scraping operation in that compartment.

Figure 6:
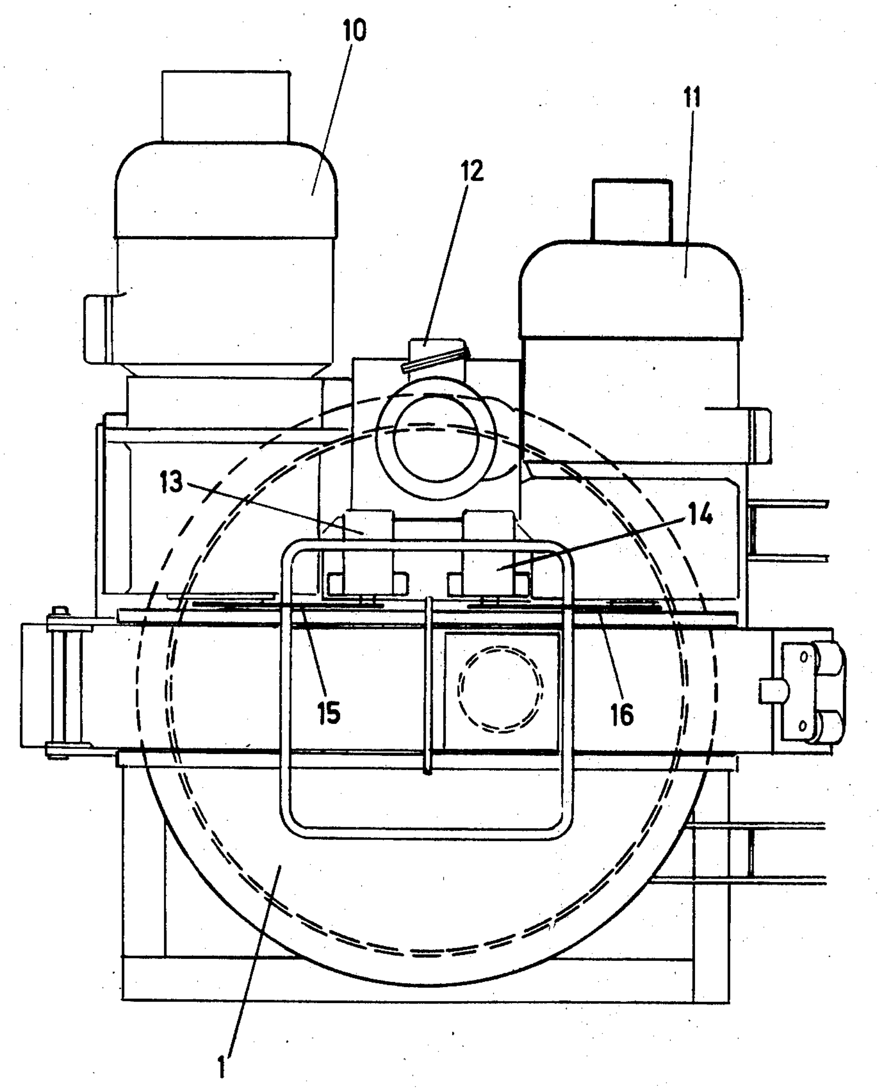
FIGURE 6 is a plan view of the sluing frame.

Having explained with reference to FIGURES 1 to 5 the sequence of movements of the boom and the scraper bucket, a description of the structural design of the device is given in the following with reference to FIGURES 6 to 9. From these additional illustrations, it can be seen how the geared motor 10 with built-in brake for the hauling rope 6 is mounted horizontally spaced a short distance on the sluing frame 1 from the geared motor 11 with built-in brake for the pull-back rope 4. Between the two geared motors 10 and 11 with built-in brake for the hauling rope 6 and the pull-back rope 4, respectively, the geared motor 12 with built-in brake for the movement of the sluing frame 1 with the boom 2 is mounted vertically. In FIGURE 6 it is also shown how the two limit switches 13 and 14 are arranged for the hauling operation produced by the geared motor 10 with built-in brake and/or the pull-back operation produced by the geared motor 11 with built-in brake. The two limit switches 13 and 14 are linked to the drive shafts of the geared motors 10 and 11 by the chain drives 15 and 16. The limit switches 13 and 14 respond after a certain number of revolutions of the two geared motors 10 and 11 have been reached.

Figure 7:
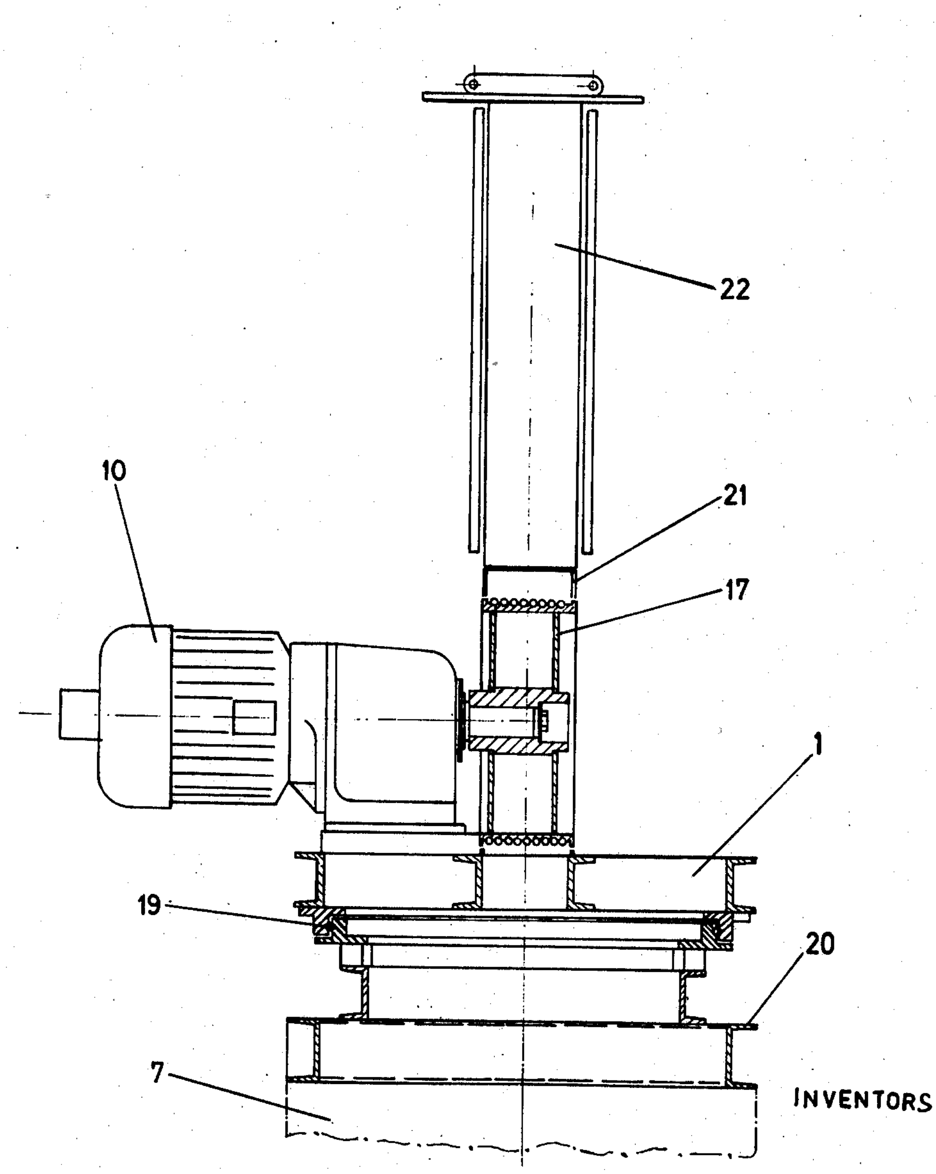
FIGURE 7 is a front view of the sluing frame, partially in vertical cross-section.
Figure 8:
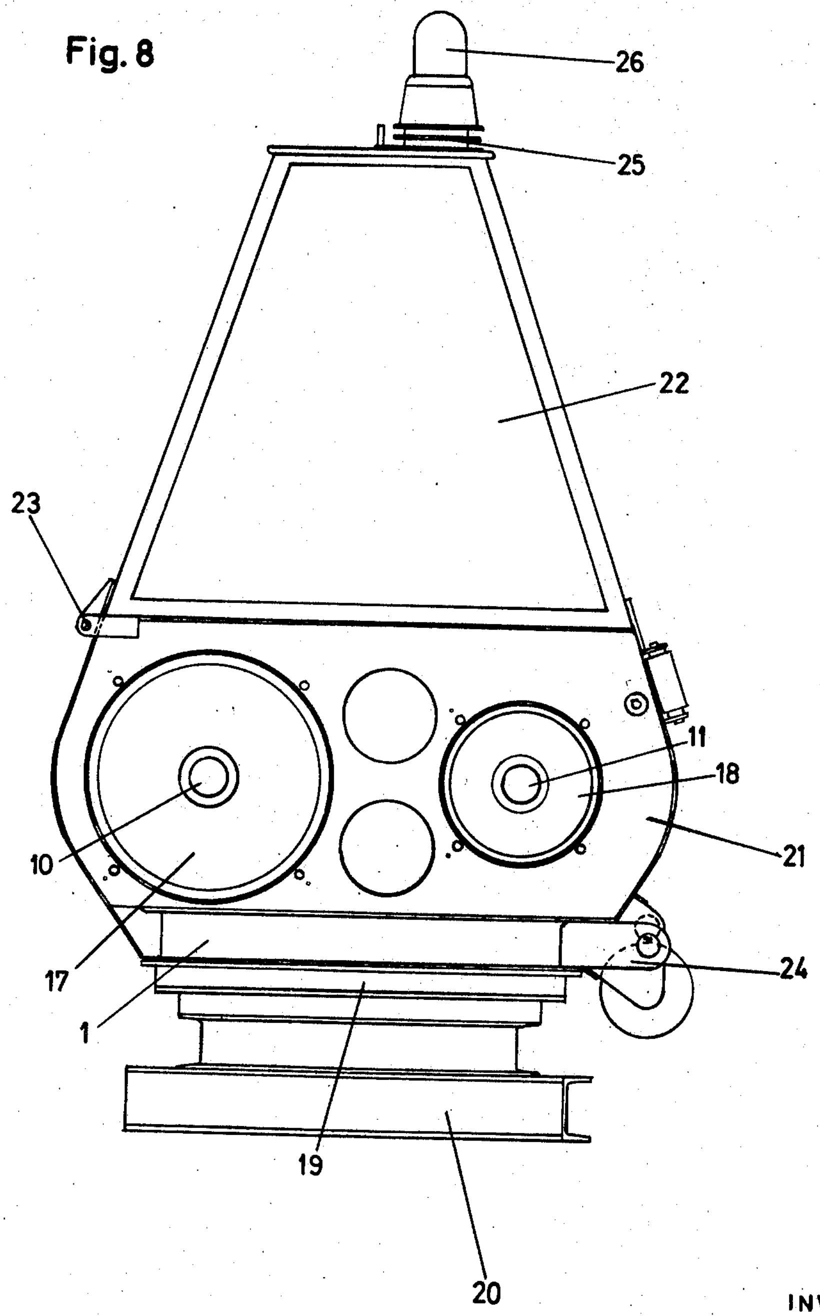
FIGURE 8 is a side view of FIGURE 6.

FIGURE 7 shows geared motor 10 for the hauling rope on the shaft of which the rope drum 17 for the hauling rope is mounted. Behind this geared motor 10 for the hauling rope is arranged, though not visible here, the geared motor 11 for the pull-back rope with the rope drum for the pull-back rope. FIGURE 7 shows how the sluing frame 1 is mounted on the sluing gear ring 19 which, in turn, is mounted on the assembly frame 20 which is carried by the feeding device 7. Finally, FIGURE 8 shows how the rope drum 17 and the rope drum 18 for the geared motor 11, which is located behind it, are arranged in a housing 21 which carries at its top a switch box 22 in which all central switching relays are incorporated. FIGURE 8 shows how the geared motors 10 and 11 with their rope drums 17 and 18, respectively, are arranged side by side and spaced a short distance. Between these two geared motors 10 and 11 there is in vertical position the geared motor with built-in brake 12 for the boom which, however, cannot be see in FIGURE 8. Also shown in FIGURE 8 are the sluing frame 1 with the sluing gear ring 19 and the assembly frame 20. Moreover, FIGURE 8 shows how the rope drums 17 and 18 are arranged wtihin the housing 21. The switch box 22 is arranged on top of the housing 21 and can be swung around the pin 23. The boom 2 is linked by pins to the assembly point 24. The holding rope for the boom 2 is anchored to the post 25 on the upper end of the switch box. On the upper end of the switch box 22 is the warning lamp 26. An identical warning lamp is mounted on the far end of the boom 2.

Figure 9:
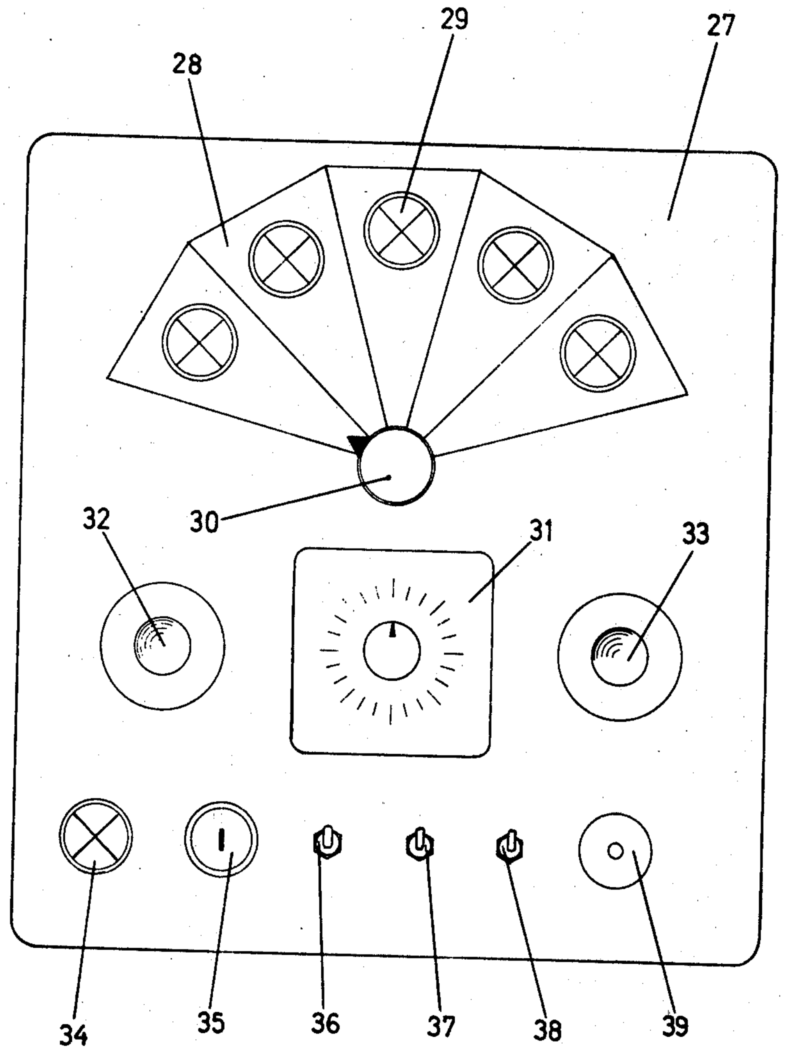
FIGURE 9 is a diagrammatic representation of the plan view of a control panel.

The control panel shown in FIGURE 9, for example, consists of a metal plate 27 on which a diagrammatic reproduction of the compartments 28 is engraved. In the performance example described, there are five compartments arranged in circular segments. Each compartment is provided with a control lamp 29. At the point of intersection of compartments 28 there is the selection switch 30 with which any compartment can be selected. The selection switch 30 has an off-position and programmed cycle control, the latter being provided in the event that a program cycle control device, a material level indicator or an empty signal are provided. Below the selection switch 30 there is the time relay 31 which serves for governing the scraping capacity. At the left of the time relay 31, there is a sluing switch 32 permitting manual control of the sluing mechanism. At the right of the time relay 31, there is the dial type switch 33 with four positions to permit manual control of the entire hauling and pull-back operations.

Adjacent the lower edge of the control panel 10 are arranged, from left to right: the control lamp 34 which flashes up as soon as the control current is connected, the key switch 35 for connecting the control current and the warning lamps 26, one arranged on top of the switch box and another at the far end of the boom, two toggle switches, switch 36 for the two positions provided for manual or automatic control and switch 37 with which the hauling operation can be reduced in accordance with requirements, toggle switch 38 for switching on or off the sluing operation within any compartment and finally, at the extreme lower right, an emergency switch 39 which interrupts the control current.

Figure 10:
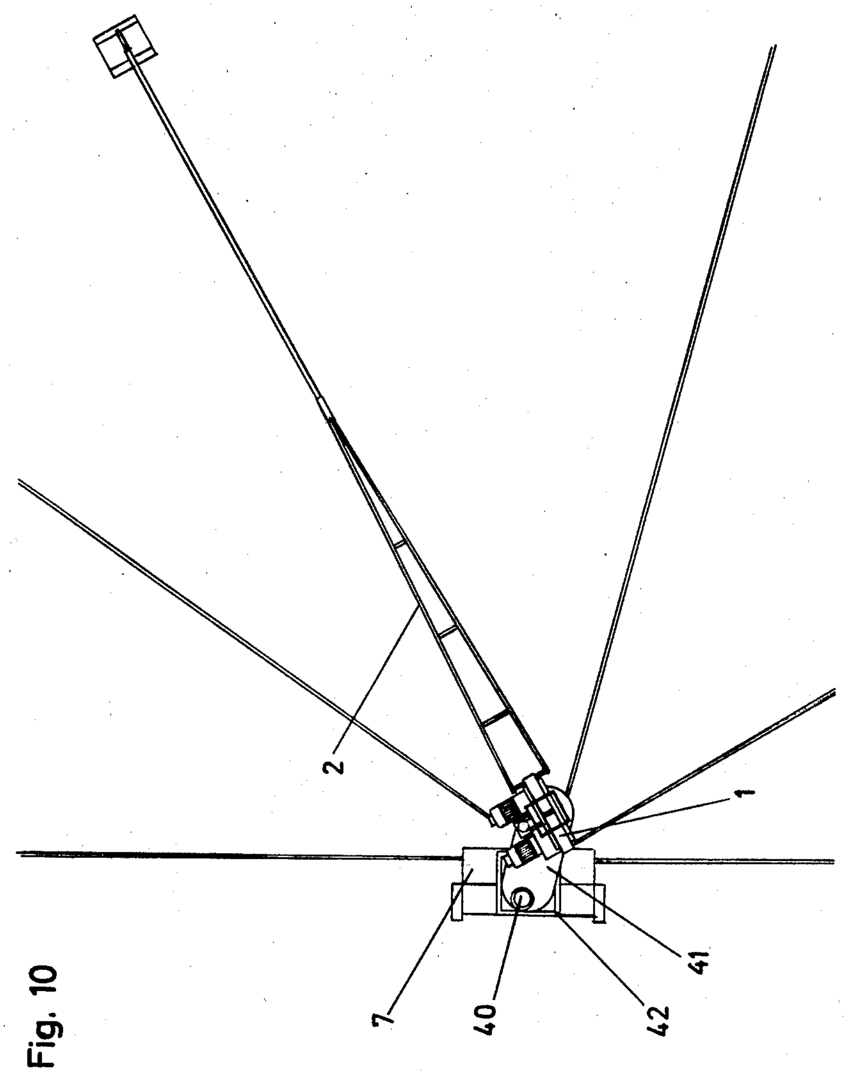
FIGURE 10 is a plan view of a different performance example of a sluing frame.

On the sluing frame 1 as shown in FIGURE 10, a second sluing gear 40 with a swivelling arm 41 is provided at the extreme end of which the frame 1 of the boom 2 is mounted with the additional sluing gear serving for selecting the compartments. This additional sluing gear is provided with a drive motor 40 and an invisible ball race ring with an assembly frame 42 which is arranged on top of the feeding device 7. By means of this additional sluing gear it is possible for the scraper bucket to completely cover the segmentally arranged compartments even if there is no common central point. Without this additional sluing gear it would not be possible to cope with such exceptional cases in the manner described.

Having now described the means by which the objects of this invention are obtained, we claim:

1. A device for moving bulk material such as concrete or bituminous aggregates from one of several compartments separated by walls to a mixer comprising boom means sluable above the compartments, a scraper bucket, rope means attached to said boom and said bucket for hauling said bucket in and out along said boom for removing material from the compartments, motor means joined to said rope means for hauling said rope means and for sluing said boom, time relay means joined to said motor means for controlling the sluing of said boom after each hauling of said rope means, and limit switch means joined to said motor means for limiting the sluing of said boom between the walls of each compartment.

2. A device as in claim 1, further comprising rope hauling switch means joined to said motor means for stopping said motor means while said rope means holds said bucket higher than the compartment walls.

3. A device as in claim 2, further comprising control lamp means joined to said relay means and said limit switch means and located centrally of said compartments for indicating the position of said bucket with respect to a compartment.

4. A device as in claim 3, said rope hauling switch means being located adjacent said control lamp means.

5. A device as in claim 4, further comprising adjustable cam controller drum means containing said relay means and said switch means.

6. A device as in claim 5, said motor means comprising independently geared motors with each motor having a built-in brake.

7. A device as in claim 6, further comprising a separate rope drum attached to each motor for hauling said rope means.

8. A device as in claim 7, a sluing frame common to and supporting said geared motors.

9. A device as in claim 8, said geared motors being spaced on said frame, a sluing motor mounted between said geared motors on said frame, and said boom being attached to said frame.

10. A device as in claim 9, said limit switch means being actuated by the number of revolutions of said geared motors.

11. A device as in claim 10, further comprising a control panel printed with the location of each of said compartments, and said control lamp means comprising a lamp in each compartment coupled to said limit switch means.

12. A device as in claim 11, further comprising a compartment selection switch on said control panel and coupled to said sluing motor.

13. A device as in claim 12, further comprising programming means joined to said sluing motor and said geared motors for the fully automatic selection of a compartment.

14. A device as in claim 13, further comprising overload current relay means joined to said geared motors for halting the hauling in movement of said bucket and starting the pull-back movement of said bucket.

References Cited

UNITED STATES PATENTS 2,781,890 2/1957 Mercier ------------- 198—36

FOREIGN PATENTS 513,002 5/1955 Canada.
993,986 6/1965 Great Britain.

GERALD M. FORLENZA, Primary Examiner

F. E. WERNER, Assistant Examiner

U.S. Cl. X.R.

214—16